(12) United States Patent
Madanahally Ramakrishna et al.

(10) Patent No.: US 12,301,319 B2
(45) Date of Patent: May 13, 2025

(54) METHOD OF BEAMFORMING AND SYSTEM FOR IMPLEMENTING BEAMFORMING

(71) Applicant: RAKUTEN SYMPHONY, INC., Tokyo (JP)

(72) Inventors: Raghavendra Madanahally Ramakrishna, Bangalore (IN); Hari Swaroop Kanzal Venkatesha, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/040,978

(22) PCT Filed: Nov. 28, 2022

(86) PCT No.: PCT/US2022/051034
§ 371 (c)(1),
(2) Date: Feb. 8, 2023

(87) PCT Pub. No.: WO2024/118040
PCT Pub. Date: Jun. 6, 2024

(65) Prior Publication Data
US 2025/0070834 A1 Feb. 27, 2025

(51) Int. Cl.
*H04B 7/06* (2006.01)

(52) U.S. Cl.
CPC .................. *H04B 7/0617* (2013.01)

(58) Field of Classification Search
CPC ..................................... H04B 7/0617
See application file for complete search history.

(56) References Cited

U.S. PATENT DOCUMENTS

2011/0255505 A1* 10/2011 Liu ............... H04W 72/23
370/330
2019/0305836 A1* 10/2019 Kapetanovic ........ H04B 7/0617

* cited by examiner

*Primary Examiner* — Vineeta S Panwalkar
(74) *Attorney, Agent, or Firm* — HAUPTMAN HAM, LLP (57) ABSTRACT

A method of beamforming includes collecting data related to a connection between a first user equipment and a network. The method further includes determining whether the first user equipment is eligible for digital beamforming. The method further includes determining, in response to a determination that the first user equipment is ineligible for digital beamforming, whether a moving speed of the first user equipment is above a first threshold value. The method further includes using broad beam beamforming for the connection between the first user equipment and the network in response to a determination that the first user equipment is moving faster than the first threshold value.

20 Claims, 4 Drawing Sheets

METHOD OF BEAMFORMING AND SYSTEM FOR IMPLEMENTING BEAMFORMING

RELATED APPLICATIONS

The present application is a National Phase of International Application No. PCT/US2022/051034, filed Nov. 28, 2022.

TECHNICAL FIELD

This description relates to a method of beamforming and a system for implementing the same.

BACKGROUND

Beamforming is a technique of providing a signal to user equipment connected to a network where a signal is directed toward the user equipment instead of broadcasting a uniform signal from an antenna in all directions. Directing a signal to specific user equipment increases the speed of communication between the user equipment and the network in comparison with approaches that provide the uniform signal in all directions.

SUMMARY

An aspect of this description relates to a method of beamforming. The method includes collecting data related to a connection between a first user equipment and a network. The method further includes determining whether the first user equipment is eligible for digital beamforming. The method further includes determining, in response to a determination that the first user equipment is ineligible for digital beamforming, whether a moving speed of the first user equipment is above a first threshold value. The method further includes using broad beam beamforming for the connection between the first user equipment and the network in response to a determination that the first user equipment is moving faster than the first threshold value.

An aspect of this description relates to a system for beamforming. The system includes a non-transitory computer readable medium configured to store instructions thereon. The system further includes a processor connected to the non-transitory computer readable medium. The processor is configured to execute the instructions for receiving data related to a connection between a first user equipment and a network. The processor is further configured to execute the instructions for determining whether the first user equipment is eligible for digital beamforming. The processor is further configured to execute the instructions for determining, in response to a determination that the first user equipment is ineligible for digital beamforming, whether a moving speed of the first user equipment is above a first threshold value. The processor is further configured to execute the instructions for instructing an antenna in the network to use broad beam beamforming for the connection between the first user equipment and the network in response to a determination that the first user equipment is moving faster than the first threshold value.

An aspect of this description relates to a non-transitory computer readable medium configured to store instructions thereon. The instructions cause a processor to receive data related to a connection between a first user equipment and a network. The instructions further cause the processor to determine whether the first user equipment is eligible for digital beamforming. The instructions further cause the processor to determine, in response to a determination that the first user equipment is ineligible for digital beamforming, whether a moving speed of the first user equipment is above a first threshold value. The instructions further cause the processor to instruct an antenna in the network to use broad beam beamforming for the connection between the first user equipment and the network in response to a determination that the first user equipment is moving faster than the first threshold value.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As telecommunication systems move toward newer generations, such as fifth generation (5G), beamforming becomes more important due to decreased coverage area for each antenna. Signal losses for 5G technology are more pronounced that other technologies, such as fourth generation (4G) or long term evolution (LTE). These signal losses increase the usefulness of beamforming to maintain the high communication speeds consumers expect from 5G communication. Beamforming is used to provide a focused signal between user equipment and a network. The focused signal helps to improve both upload and download speeds. Digital beamforming, such as sound reference signal (SRS), provides higher speeds than other types of beamforming, such as broad beam or single sideband (SSB).

While beamforming is capable of directing a focused signal toward a specific piece of user equipment, directing a focused signal toward the user equipment is not advantageous in all situations. For example, if the user equipment is moving rapidly, changing a direction of the signal to match the rapid movement of the user equipment is difficult. Providing a focused signal attempting to track with rapid movement of user equipment also has an increased risk of interruption of connection between the user equipment and the network if the movement of the signal does not sufficiently match the movement of the user equipment. Additionally, in some instances, due to lack of line of sight between the user equipment and the antenna certain types of beamforming have increased difficulty in maintaining connection between the user equipment and the network.

The current description measures a connection between user equipment and the network to determine whether the connection with the user equipment is suitable for digital beamforming. If the connection is not suitable for digital beamforming, then the beamforming method is able to select between available non-digital beamforming options. If the connection is suitable for digital beamforming, then the beamforming method is able to determine whether to use single user or multiple user digital beamforming. The ability to selectively alter the type of beamforming for specific user equipment increases the ability to provide high speed service to consumers with reduced risk of connection interruption. As a result, overall consumer satisfaction with the network improves.

Figure 1:
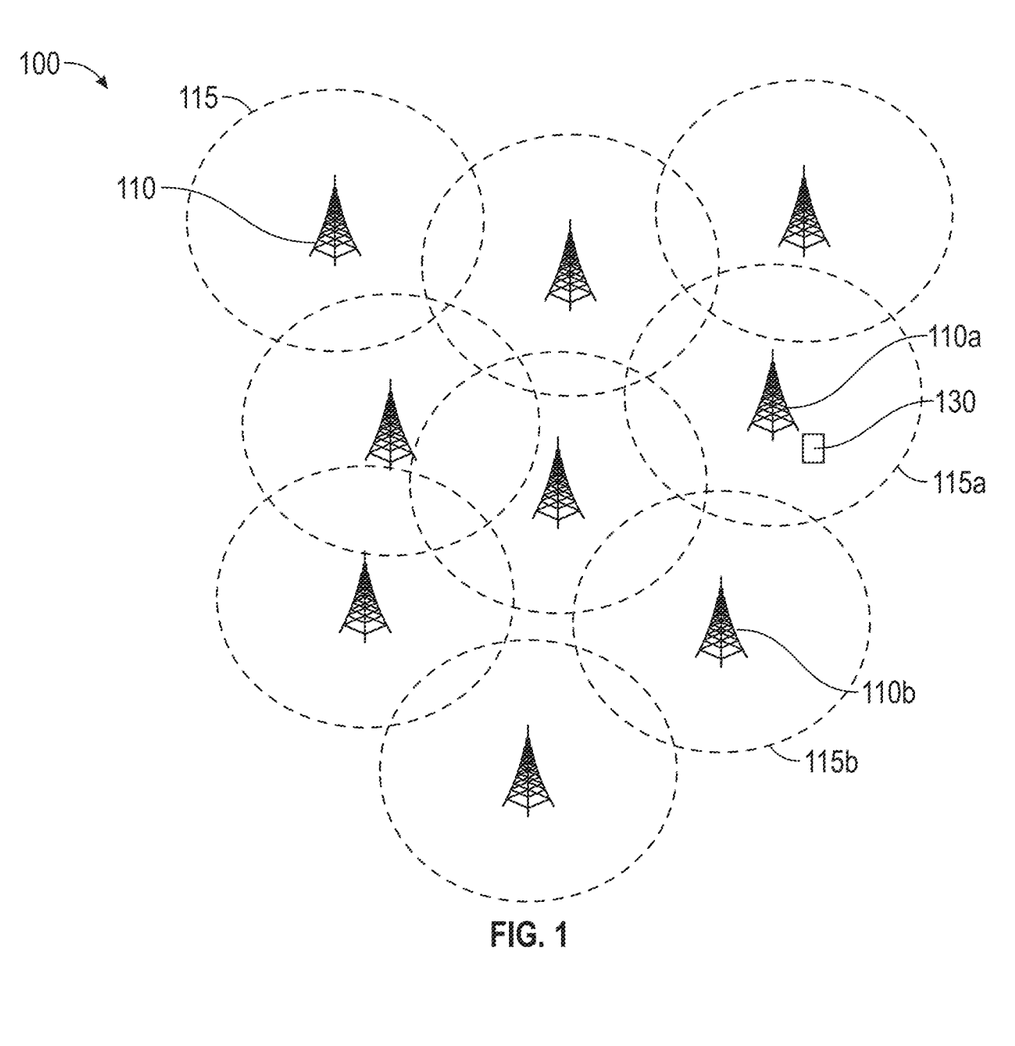
FIG. 1 is a schematic diagram of a telecommunication network in accordance with some embodiments.

FIG. 1 is a schematic diagram of a telecommunication network 100 in accordance with some embodiments. The telecommunication network 100 includes a plurality of base stations 110 and each base station 110 has a corresponding coverage area 115. A mobile device 130 within the telecommunication network 100 is able to connect to one or more base station 110 when the mobile device is within the coverage area 115 corresponding to the base station 110.

In order to improve connection speed, e.g., upload speed and/or download speed, antenna in the base station 110 are configured to use beamforming to direct a signal more precisely to the location of the mobile device 130, under certain conditions. For example, in a situation where the mobile device 130 is within the coverage area 115a of the base station 110a, antennae in the base station 110a are able to adjust a signal between the base station 110a and the mobile device 130 using beamforming in order to help improve the connection speed between the mobile device 130 and the base station 110a. The type of beamforming used to enhance the connection speed will depend on a quality of connection of between the base station 110a and the mobile device 130, movement rate of the mobile device 130 within the coverage area 115a, or other relevant factors. In some embodiments, the antennae of the base station 110a are capable of digital beamforming. In some embodiments, the antennae of the base station 110a are capable of SSB beamforming. In some embodiments, the antennae of base station 110a are capable of broad beam beamforming. In some embodiments, each of the base stations 110 have antennae having a same beamforming capabilities. In some embodiments, at least one of the base stations 110 has a different beamforming capability from at least one other base station 110. For example, in some embodiments, the base station 110b is not capable of digital beamforming, but is capable of SSB beamforming and broad beam beamforming; and the base station 110a is capable of digital beamforming, SSB beamforming, and broad beam beamforming. As a result, in some embodiments, a beamforming method is adjusted based on capabilities of antennae within the base station 110. For example, in some embodiments, the beamforming method while the mobile device 130 is within the coverage area 115a is different from the beamforming method while the mobile device 130 is within the coverage area 115b.

Figure 2:
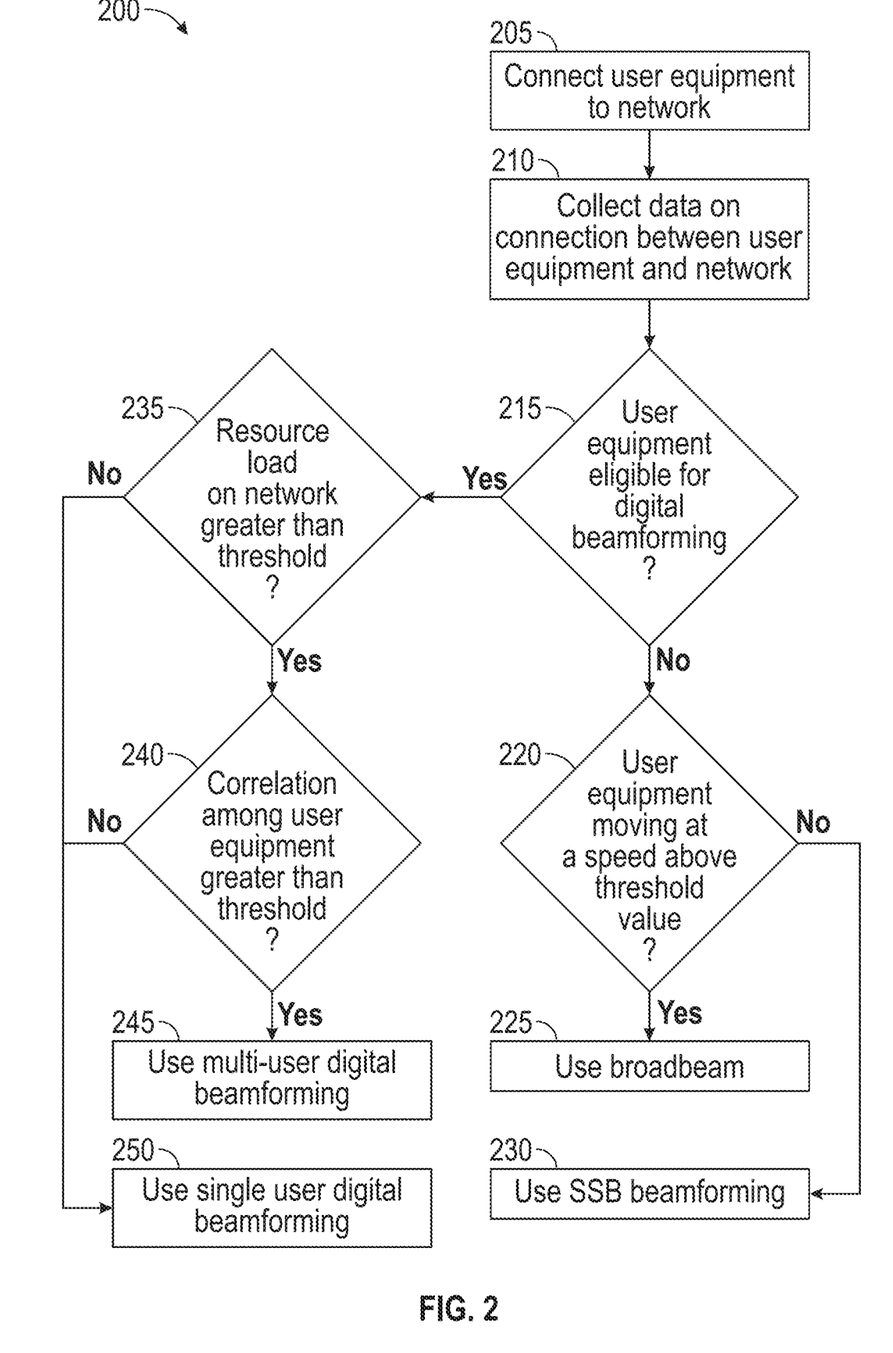
FIG. 2 is a flowchart of a method of beamforming in accordance with some embodiments.

FIG. 2 is a flowchart of a method 200 of beamforming in accordance with some embodiments. In some embodiments, the method 200 is implemented using at least one base station, e.g., a base station 110 (FIG. 1). The method 200 is usable to perform beamforming for a specific piece of user equipment, e.g., mobile device 130 (FIG. 1). By performing user equipment specific beamforming, the method 200 improves data transfer speed for the specific piece of user equipment. The method 200 is also capable of correlating beamforming across multiple pieces of user equipment in order to increase efficiency in network resources. Since each base station does not have an antenna for each piece of user equipment within a corresponding coverage area, in some instances, correlating multiple pieces of user equipment helps to improve efficiency of network resources while also improving data transfer speed for the user equipment connected to the base station.

In operation 205, user equipment is connected to a network. The user equipment is connected to the network via a wireless signal transmitted from an antenna connected to the network. In some embodiments, the user equipment includes a mobile device, e.g., mobile device 130 (FIG. 1), such as a mobile phone, a smart watch, smart glasses, an automobile, or other suitable mobile devices. In some embodiments, the user equipment includes other devices, such as a smart appliance, a digital personal assistant, an Internet of Things (IoT) device, or other suitable user equipment. In some embodiments, the user equipment is automatically connected to the network. In some embodiments, connecting the user equipment to the network includes some interaction between the user and the user equipment, such as entering a password, network identification information, user authentication information, or other suitable interactions.

In operation 210, data is collected for the connection between the user equipment and the network. The data includes key performance indicators (KPIs) for the connection between the user equipment and the network. The KPIs include information related to the strength and speed of a signal connecting the user equipment to the network. In some embodiments, the data includes multiple parameters. In some embodiments, at least one of the parameters is collected by the network. In some embodiments, at least one of the parameters is collected by the user equipment and transmitted to the network. In some embodiments, the data includes reference signal received power (RSRP), signal to noise ration (SNR), doppler effect, reference signal received quality (RSRQ), or other suitable parameters. In some embodiments, the KPIs are collected using one or more channel state information reference signal (CSI-RS) beams transmitted from the network to the user equipment.

In operation 215, a determination is made regarding whether the user equipment is eligible for digital beamforming. Digital beamforming uses multiple antennae to transmit signals having a same wavelength and phase. Digital beamforming provides fast data transfer between the user equipment and the network by having a focused signal toward a location of the user equipment. The digital beamforming is usable in situations where the user equipment has line of sight with base station and well as situations where the user equipment has no line of sight with the base station. The determination regarding whether the user equipment is eligible for digital beamforming is performed for specific pieces of user equipment on an individual equipment basis. The determination regarding whether the user equipment is eligible for digital beamforming is performed based on the data collected in the operation 210. If the data collected in the operation 210 indicates a sufficiently strong connection between the user equipment and the network, then the user equipment is determined to be eligible for digital beamforming. If the data collected in the operation 210 indicates that the connection between the user equipment and the network lacks sufficient strength, then the user equipment is determined to be ineligible for digital beamforming. If the user equipment is determined to be eligible for digital beamforming, the method 200 proceeds to operation 235. If the user equipment is determined to be ineligible for digital beamforming, the method 200 proceeds to operation 220.

In operation 220, a determination is made regarding whether a speed of the user equipment within a coverage area is above a threshold value. In some embodiments, the speed of the user equipment is determined based on a measured doppler effect from the user equipment. In some embodiments, the speed of the user equipment is determined based on global position information, e.g., global position system (GPS) information, received from the user equipment. If the user equipment is moving quickly through the coverage area of a base station, then focusing a signal toward the user equipment becomes more difficult and less likely to provide increased data transfer speed for the user equipment. In fact, in some instances, the focused signal will be unable to maintain sufficient connection to the user equipment if the user equipment is moving too fast. In response to a determination that the user equipment is moving at a speed equal to or less than the threshold value, the method proceeds to operation 230. In response to a determination that the user equipment is moving at a speed greater than the threshold value, then the method 200 proceeds to operation 225.

In operation 225, a beamforming method of broad beam is used for the connection between the user equipment and the network. The broad beam beamforming method broadcasts a wide signal across a significant portion, or all, of the coverage area. The broad beam beamforming provides lower data transfer speeds in comparison with other beamforming. However, a risk of loss of signal due to rapid movement of the user equipment within the coverage area is reduced using broad beam beamforming in comparison with other approaches.

In operation 230, a beamforming method of SSB beamforming is used for the connection between the user equipment and the network. The SSB beamforming provides faster data transfer than broad beam beamforming, but slower data transfer than digital beamforming. The SSB beamforming is used when the user equipment has a line of sight (LoS) on the base station. A width of a signal beam using the SSB beamforming is narrower than broad beam beamforming, but wider than digital beamforming.

In operation 235, a determination is made regarding whether a resource load on the network is greater than a threshold. Determining the resource load on the network determines what portion of a capacity of a base station is currently being used to provide connection to the user equipment connected to the network. As a load on the network increase, i.e., due to the connection of more pieces of user equipment, quality of service (QOS) to the user equipment has an increased risk of declining. As a result, a risk of slower data transfer or dropped signals to the user equipment increases when the load on the network increase. In some embodiments, the network load is measured using physical resource block (PRB) to determine how many subcarriers channels are in use. As the unused capacity of the network decreases, i.e., the load increases, an ability of a network to direct a signal to a single piece of user equipment decreases in order to maintain sufficient levels of service to other user equipment connected to the network. In response to a determination that the resource load on the network is greater than a threshold value, the method 200 proceeds to operation 240. In response to a determination that the resource load on the network is less than or equal to the threshold, the method 200 proceeds to operation 250.

In operation 240, a determination is made regarding whether correlation amongst multiple pieces of user equipment is greater than a threshold. The correlation between pieces of user equipment measures a similarity of signals used to connect each of the pieces of user equipment to the network. As the similarity of the signals increases, an ability to use a single signal to connect multiple pieces of user equipment to the network increases. Using a single signal to connect multiple pieces of user equipment to the network reduces a load on the network and frees up additional network resources to provide connection to other user equipment. However, if the similarity between the signals is low, then attempting to use a single signal to connect multiple pieces of user equipment to the network increases a risk that one or more of the pieces of user equipment experience poor QoS. As a result, a risk of customer dissatisfaction increases. In response to a determination that the correlation is greater than the threshold, the method 200 proceeds to operation 245. In response to a determination that the correlation is less than or equal to the threshold, the method 200 proceeds to operation 250.

In operation 245, multi-user digital beamforming is used to connect the user equipment to the network. Multi-user digital beamforming uses digital beamforming to connect multiple pieces of user equipment using a single signal. Communication among the different pieces of user equipment connected to the network using multi-user digital beamforming is implemented using time division multiplexing, in some embodiments. In some embodiments, portions of the signal from the network are allocated to each of the pieces of user equipment sharing the single signal. In comparison with single user digital beamforming, the multi-user digital beamforming reduces load on the network, but has an increased risk of slower data transfer with the network for individual pieces of user equipment. In some embodiments, the multi-user digital beamforming is implemented using sounding reference signal (SRS) beamforming.

In operation 250, single user digital beamforming is used to connect the user equipment to the network. Single user digital beamforming uses digital beamforming to a single piece of user equipment using a single signal. The dedicated signal to the single piece of user equipment provides fast data transfer between the user equipment and the network. However, the load on the network is increased in comparison with multi-user digital beamforming. In some embodiments, the single user digital beamforming is implemented using sounding reference signal (SRS) beamforming.

One of ordinary skill in the art would understand that the method 200 is usable to determine which beamforming option is able to balance network load with increased data transfer speeds for user equipment based on characteristics of a connection between the user equipment and the network. By utilizing the method 200, customers are able to receive higher data transfer speed with a reduced risk of reduced QoS or loss of signal. The ability to select beamforming techniques for each piece of user equipment also helps the network to increase efficiency in load management.

In some embodiments, the method 200 includes additional operations. For example, in some embodiments, the method 200 includes an operation where the network queries the user equipment for connection data related to a connection between the user equipment and the network. In some embodiments, the method 200 includes an operation for storing information about connection data for determining efficiency of a base station. In some embodiments, at least one operation of the method 200 is omitted. For example, in some embodiments, the operation 220 is omitted and any user equipment that is not eligible for digital beamforming is connected to the network using broad beam beamforming. In some embodiments, an order of operations of the method 200 is adjusted. For example, in some embodiments, the operation 220 is performed prior to the operation 215.

Figure 3:
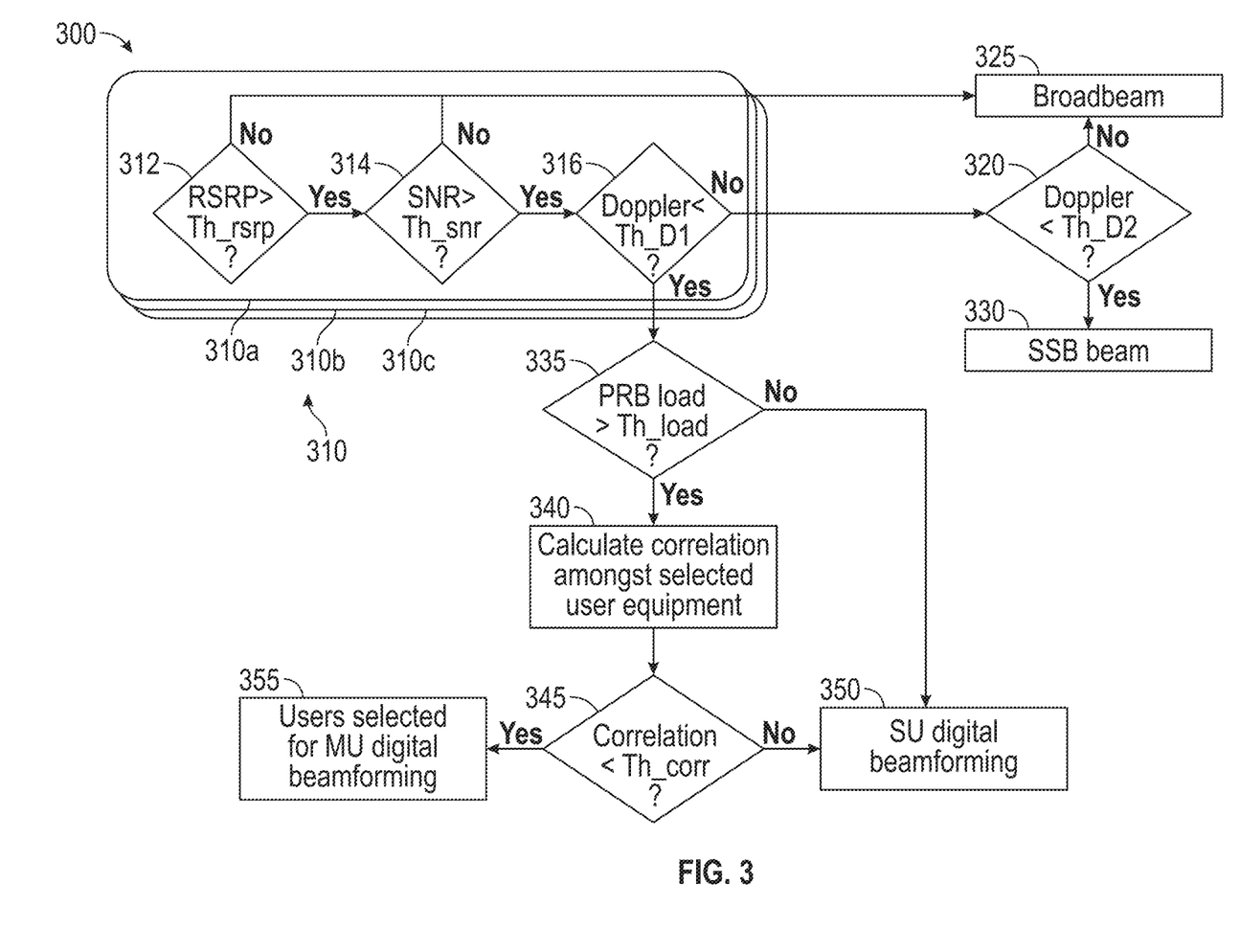
FIG. 3 is a flowchart of a method of beamforming in accordance with some embodiments.

FIG. 3 is a flowchart of a method 300 of beamforming in accordance with some embodiments. In some embodiments, the method 300 is implemented using at least one base station, e.g., a base station 110 (FIG. 1). The method 300 is usable to perform beamforming for a specific piece of user equipment, e.g., mobile device 130 (FIG. 1). By performing user equipment specific beamforming, the method 300 improves data transfer speed for the specific piece of user equipment. The method 300 is also capable of correlating beamforming across multiple pieces of user equipment in order to increase efficiency in network resources. Since each base station does not have an antenna for each piece of user equipment within a corresponding coverage area, in some instances, correlating multiple pieces of user equipment helps to improve efficiency of network resources while also improving data transfer speed for the user equipment connected to the base station. In some embodiments, the method 300 is performed simultaneously with the method 200 (FIG. 2). In some embodiments, the method 300 is performed independently from the method 200 (FIG. 2).

In operation 310, a determination is made for each piece of user equipment regarding whether the corresponding piece of user equipment is eligible for digital beamforming. In some embodiments, the operation 310 is an example of the operation 215 (FIG. 2). The operation 310 is performed for each piece of user equipment. That is, a determination is made regarding whether a first piece of user equipment is eligible for digital beamforming in operation 310a; a determination is made regarding whether a second piece of user equipment is eligible for digital beamforming in operation 310b; and a determination is made regarding whether a third piece of user equipment is eligible for digital beamforming in operation 310c. By determining whether each of the pieces of user equipment are individually eligible for digital beamforming, the method 300 is able to provide user equipment specific responses for beamforming, which increases efficiency in the user of network resources and increases the data transfer speeds available to the user equipment in applicable situations.

In some embodiments, at least one parameter of the data relied on to implement the operation 310 is collected by the network. In some embodiments, at least one parameter of the data relied on to implement the operation 310 is collected by the user equipment and transmitted to the network. The operation 310 is implemented based on the KPIs RSRP, SNR and doppler effect. One of ordinary skill in the art would understand that these KPIs are only examples and that other KPIs are usable in addition to or in place of the KPIs used in the operation 310. For example, in some embodiments, the KPI RSRP is replaced by the KPI RSRQ.

The operation 310 will be described with respect to the operation 310a for the first user equipment. One of ordinary skill in the art would understand that the discussion of operation 310 is also applicable to the operation 310b for the second user equipment; and to the operation 310c for the third user equipment. In some embodiments, the determination of eligibility for digital beamforming for each of the pieces of user equipment relies on the same KPIs. In some embodiments, the determination of eligibility for digital beamforming for at least one piece of user equipment relies on at least one different KPI from the determination of eligibility for digital beamforming for another piece of user equipment.

In operation 312, the RSRP is compared with a threshold value for the RSRP Th_rsrp. The threshold value for RSRP Th_rsrp is selected in consideration of a number of pieces of user equipment connected to a base station. As a number of pieces of user equipment connected to the base station increases, then a speed of the data transfer between the network and the user equipment slows. In some embodiments, the Th_rsrp is selected from a value in a range of about 100 to about 105. If the Th_rsrp is too high, then a risk of needlessly providing slower data transfer speeds to more pieces of user equipment is increased, in some instances. If the Th_rsrp is too low, then a risk of attempting to provide digital beamforming to a piece of user equipment that is likely to experience problems with a digital beamforming connection is increased, in some instances. In response to a determination that the RSRP is greater than the Th_rsrp, the method 300 proceeds to operation 325. In response to a determination that the RSRP is equal to or less than the Th_rsrp, the method 300 proceeds to operation 314.

In operation 314, the SNR is compared with a threshold value for the SNR Th_snr. The threshold value for SNR Th_snr is selected in consideration of a strength of a signal between the network and the user equipment to provide designated performance for the user equipment. Line of sight impacts SNR, so that as line of sight is reduced, SNC tends to decrease. In some embodiments, the Th_snr is selected from a value in a range of about 8 decibels (dB) to about 15 dB. If the Th_snr is too low, then a risk of needlessly providing slower data transfer speeds to more pieces of user equipment is increased, in some instances. If the Th_snr is too high, then a risk of attempting to provide digital beamforming to a piece of user equipment that is likely to experience problems with a digital beamforming connection is increased, in some instances. In response to a determination that the SNR is greater than the Th_snr, the method 300 proceeds to operation 316. In response to a determination that the SNR is equal to or less than the Th_snr, the method 300 proceeds to operation 325.

In operation 316, the doppler effect is compared with a first threshold value for the doppler effect Th_D1. The first threshold value for doppler effect Th_D1 is selected in consideration of how quickly a channel of the connection between the user equipment and the network is changing, which indicates a speed of movement of the user equipment. As a rate of change of the channel increases, then a risk of failing to provide a stable connection between the user equipment and the network increases. In some embodiments, the Th_D1 is selected from a value in a range of about 10 Hertz (Hz) to about 15 Hz. If the Th_D1 is too low, then a risk of needlessly providing slower data transfer speeds to more pieces of user equipment is increased, in some instances. If the Th_D1 is too high, then a risk of attempting to provide digital beamforming to a piece of user equipment that is likely to experience problems with a digital beamforming connection is increased, in some instances. In response to a determination that the doppler effect is greater than or equal to the Th_D1, the method 300 proceeds to operation 320. In response to a determination that the doppler effect is less than the Th_D1, the method 300 proceeds to operation 335.

In operation 320, the doppler effect is compared with a second threshold value for the doppler effect Th_D2. The second threshold value for doppler effect Th_D2 is selected in consideration of how quickly a channel of the connection between the user equipment and the network is changing, which indicates a speed of movement of the user equipment. As a rate of change of the channel increases, then a risk of failing to provide a stable connection between the user equipment and the network increases. In some embodiments, the Th_D2 is selected from a value in a range of about 40 Hz to about 50 Hz. If the Th_D2 is too low, then a risk of needlessly providing slower data transfer speeds to more pieces of user equipment is increased, in some instances. If the Th_D2 is too high, then a risk of attempting to provide digital beamforming to a piece of user equipment that is likely to experience problems with a digital beamforming connection is increased, in some instances. In response to a determination that the doppler effect is greater than or equal to the Th_D2, the method 300 proceeds to operation 325. In response to a determination that the doppler effect is less than the Th_D2, the method 300 proceeds to operation 330. In some embodiments, the operation 320 is similar to the operation 220 (FIG. 2)

In operation 325, a beamforming method of broad beam is used for the connection between the user equipment and the network. The broad beam beamforming method broadcasts a wide signal across a significant portion, or all, of the coverage area. The broad beam beamforming provides lower data transfer speeds in comparison with other beamforming. However, a risk of loss of signal due to rapid movement of the user equipment within the coverage area is reduced using broad beam beamforming in comparison with other approaches. In some embodiments, the operation 325 is similar to the operation 225 (FIG. 2).

In operation 330, a beamforming method of SSB beamforming is used for the connection between the user equipment and the network. The SSB beamforming provides faster data transfer than broad beam beamforming, but slower data transfer than digital beamforming. The SSB beamforming is used when the user equipment has a line of sight (LoS) on the base station. A width of a signal beam using the SSB beamforming is narrower than broad beam beamforming, but wider than digital beamforming. In some embodiments, the operation 330 is similar to the operation 230 (FIG. 2).

In operation 335, the PRB load on the network is compared with a threshold value for the load Th_load. The threshold value for load Th_load is selected in consideration of available resources within the base station providing connection to the user equipment. In some embodiments, the Th_load is selected from a value in a range of about 100 PRBs to about 300 PRBs. If the Th_load is too high, then a risk of needlessly providing slower data transfer speeds to more pieces of user equipment is increased because more pieces of user equipment are potentially connected using multi-user digital beamforming, in some instances. If the Th_load is too low, then a risk of over taxing the base station leading to equipment failure within the base station increases, in some instances. In response to a determination that the load is greater than the Th_load, the method 300 proceeds to operation 340. In response to a determination that the load is less than or equal to the Th_load, the method 300 proceeds to operation 350. In some embodiments, the operation 335 is similar to the operation 235 (FIG. 2).

In operation 340, a correlation between signals connecting different pieces of user equipment to the network is determined. The correlation measures a level of similarity between the signals in order to help determine whether a single signal could potentially be used for connecting multiple pieces of user equipment to the network.

In operation 345, the correlation of different pieces of user equipment on the network is compared with a threshold value for the correlation Th_corr. The threshold value for correlation Th_corr is selected in consideration of available resources within the base station providing connection to the user equipment. In some embodiments, the Th_corr is selected from a value in a range of about 0.1 to about 0.3. If the Th_corr is too high, then a risk of needlessly providing slower data transfer speeds to more pieces of user equipment is increased because more pieces of user equipment are connected using multi-user digital beamforming, in some instances. If the Th_corr is too low, then a risk of over taxing the base station leading to equipment failure within the base station increases, in some instances. In response to a determination that the correlation is greater than or equal to the Th_corr, the method 300 proceeds to operation 350. In response to a determination that the correlation is less than the Th_corr, the method 300 proceeds to operation 355. In some embodiments, the operation 345 is similar to the operation 240 (FIG. 2).

In operation 350, single user digital beamforming is used to connect the user equipment to the network. Single user digital beamforming uses digital beamforming to a single piece of user equipment using a single signal. The dedicated signal to the single piece of user equipment provides fast data transfer between the user equipment and the network. However, the load on the network is increased in comparison with multi-user digital beamforming. In some embodiments, the single user digital beamforming is implemented using sounding reference signal (SRS) beamforming. In some embodiments, the operation 350 is similar to the operation 250 (FIG. 2).

In operation 355, multi-user digital beamforming is used to connect the user equipment to the network. Multi-user digital beamforming uses digital beamforming to connect multiple pieces of user equipment using a single signal. Communication among the different pieces of user equipment connected to the network using multi-user digital beamforming is implemented using time division multiplexing, in some embodiments. In some embodiments, portions of the signal from the network are allocated to each of the pieces of user equipment sharing the single signal. In comparison with single user digital beamforming, the multi-user digital beamforming reduces load on the network, but has an increased risk of slower data transfer with the network for individual pieces of user equipment. In some embodiments, the multi-user digital beamforming is implemented using sounding reference signal (SRS) beamforming. In some embodiments, the operation 355 is similar to the operation 245 (FIG. 2).

One of ordinary skill in the art would understand that the method 300 is usable to determine which beamforming option is able to balance network load with increased data transfer speeds for user equipment based on characteristics of a connection between the user equipment and the network. By utilizing the method 300, customers are able to receive higher data transfer speed with a reduced risk of reduced QoS or loss of signal. The ability to select beamforming techniques for each piece of user equipment also helps the network to increase efficiency in load management.

In some embodiments, the method 300 includes additional operations. For example, in some embodiments, the method 300 includes an operation where the network queries the user equipment for connection data related to a connection between the user equipment and the network. In some embodiments, the method 300 includes an operation for storing information about connection data for determining efficiency of a base station. In some embodiments, at least one operation of the method 300 is omitted. For example, in some embodiments, the operation 330 is omitted and any user equipment that is not eligible for digital beamforming is connected to the network using broad beam beamforming. In some embodiments, an order of operations of the method 300 is adjusted. For example, in some embodiments, the operation 340 is performed prior to the operation 335.

Figure 4:
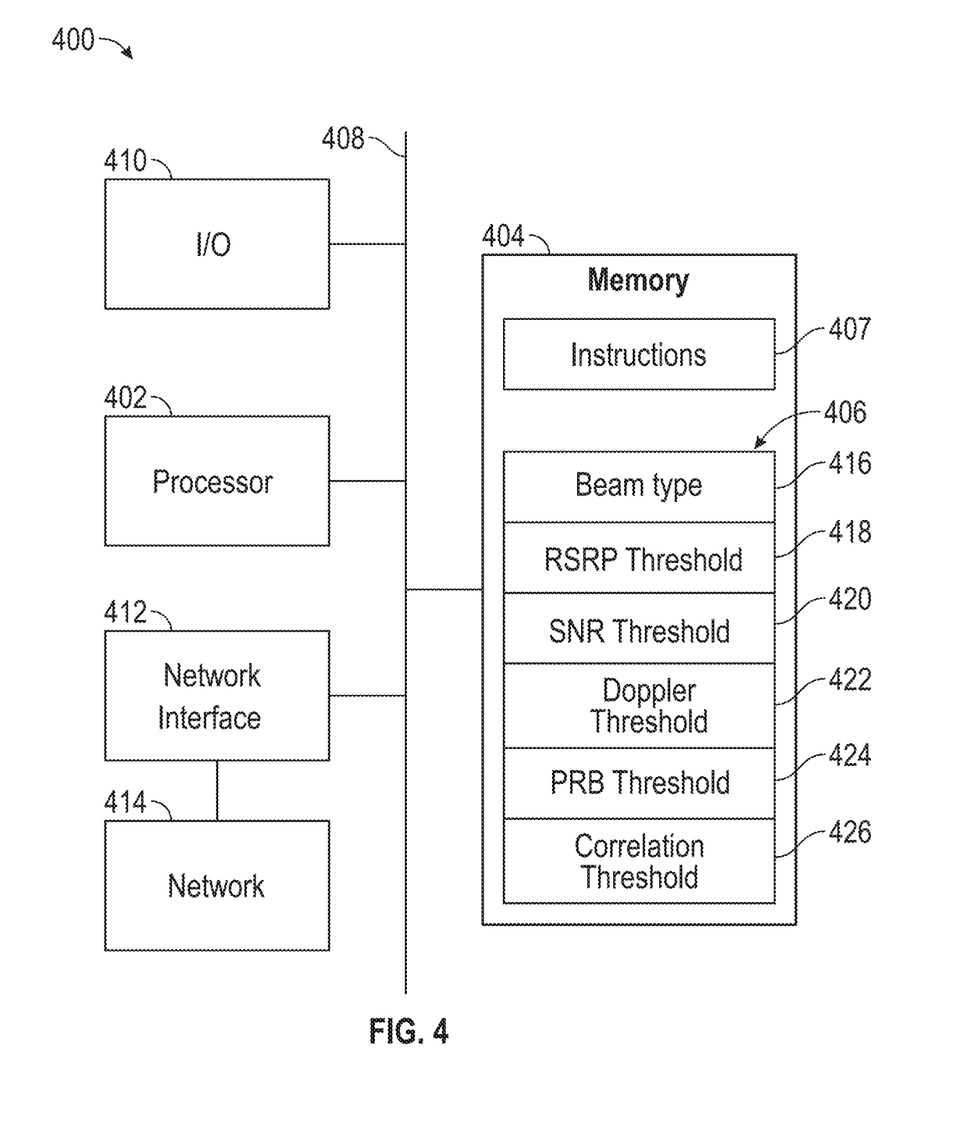
FIG. 4 is a block diagram of a system for beamforming in accordance with some embodiments.

FIG. 4 is a block diagram of a system 400 for implementing beamforming in accordance with some embodiments. System 400 includes a hardware processor 402 and a non-transitory, computer readable storage medium 404 encoded with, i.e., storing, the computer program code 406, i.e., a set of executable instructions. Computer readable storage medium 404 is also encoded with instructions 407 for interfacing with external devices. The processor 402 is electrically coupled to the computer readable storage medium 404 via a bus 408. The processor 402 is also electrically coupled to an I/O interface 410 by bus 408. A network interface 412 is also electrically connected to the processor 402 via bus 408. Network interface 412 is connected to a network 414, so that processor 402 and computer readable storage medium 404 are capable of connecting to external elements via network 414. The processor 402 is configured to execute the computer program code 406 encoded in the computer readable storage medium 404 in order to cause system 400 to be usable for performing a portion or all of the operations as described in method 200 (FIG. 2), or method 300 (FIG. 3).

In some embodiments, the processor 402 is a central processing unit (CPU), a multi-processor, a distributed processing system, an application specific integrated circuit (ASIC), and/or a suitable processing unit.

In some embodiments, the computer readable storage medium 404 is an electronic, magnetic, optical, electromagnetic, infrared, and/or a semiconductor system (or apparatus or device). For example, the computer readable storage medium 404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-R/W), and/or a digital video disc (DVD).

In some embodiments, the storage medium 404 stores the computer program code 406 configured to cause system 400 to perform a portion or all of the operations as described in method 200 (FIG. 2), or method 300 (FIG. 3). In some embodiments, the storage medium 404 also stores information for performing a portion or all of the operations as described in method 200 (FIG. 2), or method 300 (FIG. 3) as well as information generated during performing a portion or all of the operations as described in method 200 (FIG. 2), or method 300 (FIG. 3), such as a beam type parameter 416, a RSRP threshold parameter 418, a SNR threshold parameter 420, a doppler threshold parameter 422, a PRB threshold parameter 424, a correlation threshold parameter 426 and/or a set of executable instructions to perform a portion or all of the operations as described in method 200 (FIG. 2), or method 300 (FIG. 3).

In some embodiments, the storage medium 404 stores instructions 407 for interfacing with external devices. The instructions 407 enable processor 402 to generate and receive instructions readable by the external devices to effectively perform a portion or all of the operations as described in method 200 (FIG. 2), or method 300 (FIG. 3).

System 400 includes I/O interface 410. I/O interface 410 is coupled to external circuitry. In some embodiments, I/O interface 410 includes a keyboard, keypad, mouse, trackball, trackpad, and/or cursor direction keys for communicating information and commands to processor 402.

System 400 also includes network interface 412 coupled to the processor 402. Network interface 412 allows system 400 to communicate with network 414, to which one or more other computer systems are connected. Network interface 412 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in method 200 (FIG. 2), or method 300 (FIG. 3) is implemented in two or more systems 400, and information is exchanged between different systems 400 via network 414.

An aspect of this description relates to a method of beamforming. The method includes collecting data related to a connection between a first user equipment and a network. The method further includes determining whether the first user equipment is eligible for digital beamforming. The method further includes determining, in response to a determination that the first user equipment is ineligible for digital beamforming, whether a moving speed of the first user equipment is above a first threshold value. The method further includes using broad beam beamforming for the connection between the first user equipment and the network in response to a determination that the first user equipment is moving faster than the first threshold value. In some embodiments, the method further includes using single sideband (SSB) beamforming for the connection between the first user equipment and the network in response to a determination that the first user equipment is not moving faster than the first threshold value. In some embodiments, the method further includes determining, in response to a determination that the first user equipment is eligible for digital beamforming, whether a load on the network exceeds a load threshold value. In some embodiments, the method further includes using single user digital beamforming for the connection between the first user equipment and the network in response to a determination that the load on the network fails to exceed the load threshold value. In some embodiments, the method further includes determining, in response to a determination that the load on the network exceeds the load threshold value, whether a correlation between the first user equipment and a second user equipment connected to the network exceeds a correlation threshold value. In some embodiments, the method further includes using multi-user digital beamforming for the connection between the first user equipment and the network in response to a determination that the correlation between the first user equipment and the second user equipment exceeds the correlation threshold value. In some embodiments, the method further includes determining whether a second user equipment is eligible for digital beamforming independently of the determining whether the first user equipment is eligible for digital beamforming, wherein the second user equipment is connected to the network.

An aspect of this description relates to a system for beamforming. The system includes a non-transitory computer readable medium configured to store instructions thereon. The system further includes a processor connected to the non-transitory computer readable medium. The processor is configured to execute the instructions for receiving data related to a connection between a first user equipment and a network. The processor is further configured to execute the instructions for determining whether the first user equipment is eligible for digital beamforming. The processor is further configured to execute the instructions for determining, in response to a determination that the first user equipment is ineligible for digital beamforming, whether a moving speed of the first user equipment is above a first threshold value. The processor is further configured to execute the instructions for instructing an antenna in the network to use broad beam beamforming for the connection between the first user equipment and the network in response to a determination that the first user equipment is moving faster than the first threshold value. In some embodiments, the processor is further configured to execute the instructions for instructing the antenna to use single sideband (SSB) beamforming for the connection between the first user equipment and the network in response to a determination that the first user equipment is not moving faster than the first threshold value. In some embodiments, the processor is further configured to execute the instructions for determining, in response to a determination that the first user equipment is eligible for digital beamforming, whether a load on the network exceeds a load threshold value. In some embodiments, the processor is further configured to execute the instructions for instructing the antenna to use single user digital beamforming for the connection between the first user equipment and the network in response to a determination that the load on the network fails to exceed the load threshold value. In some embodiments, the processor is further configured to execute the instructions for determining, in response to a determination that the load on the network exceeds the load threshold value, whether a correlation between the first user equipment and a second user equipment connected to the network exceeds a correlation threshold value. In some embodiments, the processor is further configured to execute the instructions for instructing the antenna to use multi-user digital beamforming for the connection between the first user equipment and the network in response to a determination that the correlation between the first user equipment and the second user equipment exceeds the correlation threshold value. In some embodiments, the processor is further configured to execute the instructions for determining whether a second user equipment is eligible for digital beamforming independently of the determining whether the first user equipment is eligible for digital beamforming, wherein the second user equipment is connected to the network.

An aspect of this description relates to a non-transitory computer readable medium configured to store instructions thereon. The instructions cause a processor to receive data related to a connection between a first user equipment and a network. The instructions further cause the processor to determine whether the first user equipment is eligible for digital beamforming. The instructions further cause the processor to determine, in response to a determination that the first user equipment is ineligible for digital beamforming, whether a moving speed of the first user equipment is above a first threshold value. The instructions further cause the processor to instruct an antenna in the network to use broad beam beamforming for the connection between the first user equipment and the network in response to a determination that the first user equipment is moving faster than the first threshold value. In some embodiments, the instructions are further configured to cause the processor to instruct the antenna to use single sideband (SSB) beamforming for the connection between the first user equipment and the network in response to a determination that the first user equipment is not moving faster than the first threshold value. In some embodiments, the instructions further cause the processor to determine, in response to a determination that the first user equipment is eligible for digital beamforming, whether a load on the network exceeds a load threshold value. In some embodiments, the instructions are further configured to cause the processor to instruct the antenna to use single user digital beamforming for the connection between the first user equipment and the network in response to a determination that the load on the network fails to exceed the load threshold value. In some embodiments, the instructions are further configured to cause the processor to determine, in response to a determination that the load on the network exceeds the load threshold value, whether a correlation between the first user equipment and a second user equipment connected to the network exceeds a correlation threshold value. In some embodiments, the instructions are further configured to cause the processor to instruct the antenna to use multi-user digital beamforming for the connection between the first user equipment and the network in response to a determination that the correlation between the first user equipment and the second user equipment exceeds the correlation threshold value.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of beamforming, the method comprising:
   collecting data related to a connection between a first user equipment and a network;
   determining whether the first user equipment is eligible for digital beamforming;
   determining, in response to a determination that the first user equipment is ineligible for digital beamforming, whether a moving speed of the first user equipment is above a first threshold value; and using broad beam beamforming for the connection between the first user equipment and the network in response to a determination that the first user equipment is moving faster than the first threshold value.

2. The method of claim 1, further comprising:
using single sideband (SSB) beamforming for the connection between the first user equipment and the network in response to a determination that the first user equipment is not moving faster than the first threshold value.

3. The method of claim 1, further comprising:
determining, in response to a determination that the first user equipment is eligible for digital beamforming, whether a load on the network exceeds a load threshold value.

4. The method of claim 3, further comprising:
using single user digital beamforming for the connection between the first user equipment and the network in response to a determination that the load on the network fails to exceed the load threshold value.

5. The method of claim 3, further comprising:
determining, in response to a determination that the load on the network exceeds the load threshold value, whether a correlation between the first user equipment and a second user equipment connected to the network exceeds a correlation threshold value.

6. The method of claim 5, further comprising:
using multi-user digital beamforming for the connection between the first user equipment and the network in response to a determination that the correlation between the first user equipment and the second user equipment exceeds the correlation threshold value.

7. The method of claim 1, further comprising:
determining whether a second user equipment is eligible for digital beamforming independently of the determining whether the first user equipment is eligible for digital beamforming, wherein the second user equipment is connected to the network.

8. A system for beamforming, the system comprising:
a non-transitory computer readable medium configured to store instructions thereon; and
a processor connected to the non-transitory computer readable medium, wherein the processor is configured to execute the instructions for:
receiving data related to a connection between a first user equipment and a network;
determining whether the first user equipment is eligible for digital beamforming;
determining, in response to a determination that the first user equipment is ineligible for digital beamforming, whether a moving speed of the first user equipment is above a first threshold value; and
instructing an antenna in the network to use broad beam beamforming for the connection between the first user equipment and the network in response to a determination that the first user equipment is moving faster than the first threshold value.

9. The system of claim 8, wherein the processor is further configured to execute the instructions for:
instructing the antenna to use single sideband (SSB) beamforming for the connection between the first user equipment and the network in response to a determination that the first user equipment is not moving faster than the first threshold value.

10. The system of claim 8, wherein the processor is further configured to execute the instructions for:
determining, in response to a determination that the first user equipment is eligible for digital beamforming, whether a load on the network exceeds a load threshold value.

11. The system of claim 10, wherein the processor is further configured to execute the instructions for:
instructing the antenna to use single user digital beamforming for the connection between the first user equipment and the network in response to a determination that the load on the network fails to exceed the load threshold value.

12. The system of claim 10, wherein the processor is further configured to execute the instructions for:
determining, in response to a determination that the load on the network exceeds the load threshold value, whether a correlation between the first user equipment and a second user equipment connected to the network exceeds a correlation threshold value.

13. The system of claim 12, wherein the processor is further configured to execute the instructions for:
instructing the antenna to use multi-user digital beamforming for the connection between the first user equipment and the network in response to a determination that the correlation between the first user equipment and the second user equipment exceeds the correlation threshold value.

14. The system of claim 8, wherein the processor is further configured to execute the instructions for:
determining whether a second user equipment is eligible for digital beamforming independently of the determining whether the first user equipment is eligible for digital beamforming, wherein the second user equipment is connected to the network.

15. A non-transitory computer readable medium configured to store instructions thereon for causing a processor to:
receive data related to a connection between a first user equipment and a network;
determine whether the first user equipment is eligible for digital beamforming;
determine, in response to a determination that the first user equipment is ineligible for digital beamforming, whether a moving speed of the first user equipment is above a first threshold value; and
instruct an antenna in the network to use broad beam beamforming for the connection between the first user equipment and the network in response to a determination that the first user equipment is moving faster than the first threshold value.

16. The non-transitory computer readable medium of claim 15, wherein the instructions are further configured to cause the processor to:
instruct the antenna to use single sideband (SSB) beamforming for the connection between the first user equipment and the network in response to a determination that the first user equipment is not moving faster than the first threshold value.

17. The non-transitory computer readable medium of claim 15, wherein the instructions are further configured to cause the processor to:
determine, in response to a determination that the first user equipment is eligible for digital beamforming, whether a load on the network exceeds a load threshold value.

18. The non-transitory computer readable medium of claim 17, wherein the instructions are further configured to cause the processor to:

instruct the antenna to use single user digital beamforming for the connection between the first user equipment and the network in response to a determination that the load on the network fails to exceed the load threshold value.

19. The non-transitory computer readable medium of claim 17, wherein the instructions are further configured to cause the processor to:
   determine, in response to a determination that the load on the network exceeds the load threshold value, whether a correlation between the first user equipment and a second user equipment connected to the network exceeds a correlation threshold value.

20. The non-transitory computer readable medium of claim 19, wherein the instructions are further configured to cause the processor to:
   instruct the antenna to use multi-user digital beamforming for the connection between the first user equipment and the network in response to a determination that the correlation between the first user equipment and the second user equipment exceeds the correlation threshold value.

* * * * *